US010962828B2

(12) United States Patent
Kyoukane et al.

(10) Patent No.: US 10,962,828 B2
(45) Date of Patent: Mar. 30, 2021

(54) ILLUMINATION DEVICE AND DISPLAY USING LIGHT REFLECTOR

(71) Applicant: SHARP KABUSHIKI KAISHA, Sakai (JP)

(72) Inventors: Youzou Kyoukane, Sakai (JP); Takeshi Masuda, Sakai (JP); Hisashi Watanabe, Sakai (JP); Hirotoshi Yasunaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/689,068

(22) Filed: Nov. 19, 2019

(65) Prior Publication Data

US 2020/0166803 A1  May 28, 2020

Related U.S. Application Data

(60) Provisional application No. 62/771,087, filed on Nov. 24, 2018.

(51) Int. Cl.
*G02F 1/1335* (2006.01)
*G02F 1/13357* (2006.01)

(52) U.S. Cl.
CPC .. *G02F 1/133603* (2013.01); *G02F 1/133605* (2013.01); *G02F 1/133608* (2013.01)

(58) Field of Classification Search
CPC ......... G02F 1/133603; G02F 1/133608; G02F 1/133605
See application file for complete search history.

(56) References Cited

U.S. PATENT DOCUMENTS

| 9,316,385 | B2* | 4/2016 | Maeda | F21V 29/00 |
| 10,264,225 | B2* | 4/2019 | Seetzen | G02F 1/133605 |
| 10,304,813 | B2* | 5/2019 | Kuo | H01L 25/167 |
| 2006/0290830 | A1* | 12/2006 | Teramoto | G02F 1/133514 349/56 |
| 2010/0320482 | A1* | 12/2010 | Tachibana | H05K 3/284 257/88 |
| 2011/0292316 | A1 | 12/2011 | Fujimoto et al. | |
| 2013/0201663 | A1* | 8/2013 | Cho | G02F 1/133608 362/97.2 |
| 2018/0196312 | A1* | 7/2018 | Kumamoto | G02F 1/133605 |
| 2019/0187518 | A1* | 6/2019 | Her | G02F 1/133611 |
| 2020/0183228 | A1* | 6/2020 | Chen | G02F 1/133603 |

FOREIGN PATENT DOCUMENTS

JP  2011-248120 A  12/2011

* cited by examiner

*Primary Examiner* — Tracie Y Green
(74) *Attorney, Agent, or Firm* — ScienBiziP, P.C.

(57) ABSTRACT

[Object] To provide an illumination device that suppresses degradation of display quality by preventing damage of light source elements, a reflection sheet, and an optical sheet; and a display.
[Solution] A backlight device 10 includes: an LED substrate 11; a plurality of LEDs 15 disposed adjacent to each other on the LED substrate 11; an optical member 24 disposed to face the LEDs 15; a reflection sheet 12 disposed on the LED substrate 11 and having a plurality of openings at which the LEDs 15 are disposed; and a support body 17 formed at least in a gap between the reflection sheet 12 and the LEDs 15, at at least one of the plurality of openings, the support body 17 projecting further than the LEDs 15 on a side opposite to the LED substrate 11 and supporting the optical member 24.

11 Claims, 5 Drawing Sheets

ILLUMINATION DEVICE AND DISPLAY USING LIGHT REFLECTOR

TECHNICAL FIELD

The present invention relates to an illumination device including light source elements and a reflection sheet on a substrate and including an optical sheet on the upper side thereof, and a display.

BACKGROUND ART

In recent years, with the spread of LEDs (light emitting diodes), backlight of displays increasingly employ a so-called direct illumination device in which light sources are disposed at the rear of a light emitting surface of the illumination device. In addition, by employing, in addition to the direct type, a local dimming (local diming) drive of light sources, contrast of display images can be improved. Thus, also for the pursuit of high brightness and high image quality, direct illumination devices are increasingly employed for backlight.

For example, Patent Literature 1 discloses a direct illumination device usable as backlight. In the illumination device described in Patent Literature 1, to prevent a decrease in brightness due to expansion and contraction of a reflection sheet, there are disposed, with respect to the reflection sheet and an LED substrate, a fixing member and a holding member that pass through the reflection sheet and the LED substrate and that attach both to each other.

CITATION LIST

Patent Literature

[Patent Literature 1] Japanese Unexamined Patent Application Publication "No. 2011-248120"

SUMMARY OF INVENTION

Technical Problem

In the illumination device described in Patent Literature 1 mentioned above, in consideration of expansion and contraction of the reflection sheet, the reflection sheet is held by the holding member with the degree of freedom of the movement of the reflection sheet being increased by widening LED holes of the reflection sheet. Therefore, due to the effective area of the reflection sheet being decreased, brightness may decrease, and the reflection sheet may move and be damaged by coming into contact with LEDs. As a result, display quality of a display that uses the illumination device may be degraded.

The present invention is developed in consideration of the aforementioned problem, and an object thereof is to provide an illumination device that suppresses degradation of display quality by preventing damage of light source elements, a reflection sheet, and an optical sheet, and a display.

Solution to Problem (1) An embodiment of the present invention is an illumination device including: a substrate; a plurality of light source elements disposed adjacent to each other on the substrate; an optical member disposed to face the light source elements; a reflection member disposed on the substrate and having a plurality of openings at which the light source elements are disposed; and a support body formed at least in a gap between the reflection member and the light source elements, at least one of the plurality of openings, the support body projecting further than the light source elements on a side opposite to the substrate and supporting the optical member.

Note that the optical member is, for example, a QD phosphor sheet or an oxide phosphor sheet, or a prism sheet, a brightness increasing sheet, or a diffusion sheet and the like.

(2) One embodiment of the present invention is the illumination device in which, in addition to the configuration in (1) above, the support body is made of a transparent resin.

(3) One embodiment of the present invention is the illumination device in which, in addition to the configuration in (1) or (2) above, a height of the reflection member and a height of the light source elements are equal or substantially equal to each other.

(4) One embodiment of the present invention is the illumination device in which, in addition to any one of configurations in (1) to (3) above, a plurality of the support bodies are formed with respect to each one of the openings.

(5) One embodiment of the present invention is the illumination device in which, in addition to any one of the configurations in (1) to (4) above, the support body is formed in a linear shape so as to be continuously disposed at two or more of the openings in plan view.

(6) One embodiment of the present invention is the illumination device in which, in addition to the configuration in (2) above, the support body is formed at an entirety of the reflection member and an entirety of gaps of the plurality of openings.

(7) One embodiment of the present invention is the illumination device in which, in addition to the configuration in (6) above, the support body is formed at an entirety of the plurality of light source elements.

(8) One embodiment of the present invention is a display including the illumination device described in any one of (1) to (7) above.

Advantageous Effects of Invention

The present invention exerts an effect of providing: an illumination device that suppresses degradation of display quality by preventing damage of light source elements, a reflection sheet, and an optical sheet; and a display.

DESCRIPTION OF EMBODIMENTS

Hereinafter, embodiments according to the present invention will be described with reference to the drawings. In the following description, components identical to each other are given an identical sign. Names and functions thereof are also the same, and thus, detailed description thereof will not be repeated. Note that an X axis, a Y axis, and a Z axis are illustrated in a portion of each of the drawings, and each axis direction is illustrated so as to be a direction illustrated in each of the drawings. In addition, the upper side of FIG. 1 is a front side, and the lower side of FIG. 1 is a rear side.

First Embodiment

Figure 1:
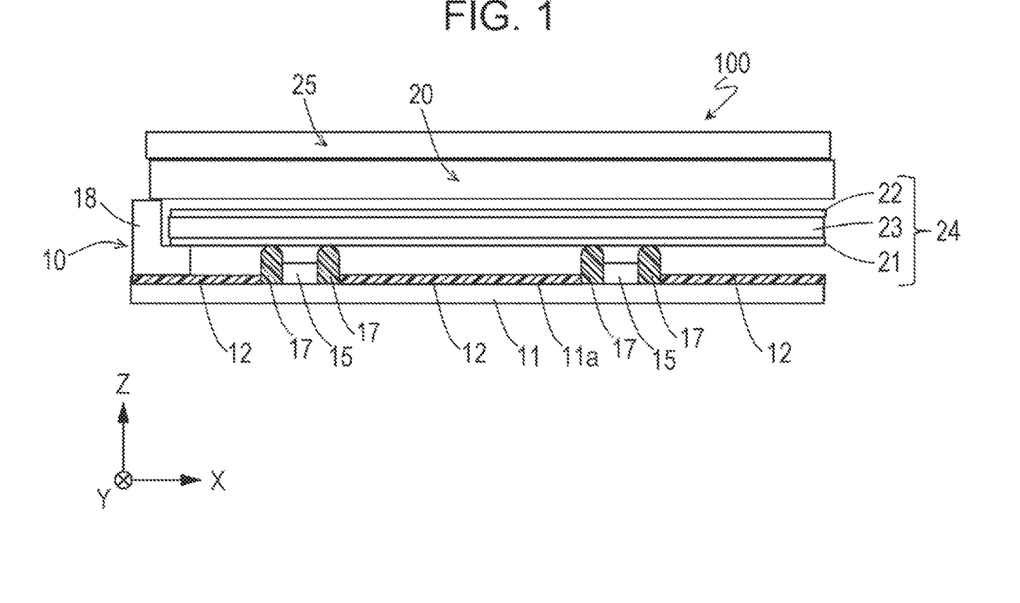
FIG. 1 is a schematic sectional view illustrating a configuration of a main part of a display that uses an illumination device according to a first embodiment of the present invention.

FIG. 1 is a schematic sectional view illustrating a configuration of a main part of a liquid crystal display 100 (display) according to a first embodiment.

As illustrated in FIG. 1, the liquid crystal display 100 includes a backlight device 10 (illumination device) at the rear of a liquid crystal panel 20. Between the liquid crystal panel 20 and the backlight device 10, an optical member 24 including an optical sheet 21, an optical sheet 22, a diffusion sheet 23, and the like are disposed.

The optical sheet 21 is a wavelength conversion sheet (for example, a QD phosphor sheet, an oxide phosphor sheet, or the like), which will be described later. The optical sheet 22 may be a prism sheet or a brightness increasing sheet. The diffusion sheet 23 is an optical sheet that diffuses light and widens an irradiation range.

Note that the order of the sheets of the optical member 24 and the number of the sheets are not limited thereto. For example, the wavelength conversion sheet used as the optical sheet 21 may be omitted depending on the configuration of LEDs 15. The optical member 24 defined in the present invention is a sheet of the optical sheet 21, the optical sheet 22, the diffusion sheet 23, or the like. Specifically, the optical member 24 is, for example, a QD phosphor sheet or an oxide phosphor sheet, or a prism sheet, a brightness increasing sheet, or a diffusion sheet and the like. In addition, the optical member 24 may be a single sheet or a plurality sheets constituted by these sheets laminated on each other to form the optical member 24.

The optical member 24 and the liquid crystal panel 20 are held by a frame 18 fixed to the backlight device 10.

The liquid crystal display 100 further includes a transparent protection member 25 disposed on the liquid crystal panel 20.

The transparent protection member 25 is bonded onto the liquid crystal panel 20 with a transparent bonding member, such as a functional film (OCA (Optical Clear Adhesive) Film) or the like, interposed therebetween. The transparent protection member 25 can be constituted by a cover glass or a touch panel and has a function of protecting a display surface of the liquid crystal panel 20. The transparent protection member 25 and the liquid crystal panel 20 may each have an arbitrary configuration, and various configurations are known; thus, detailed description is omitted.

Figure 2:
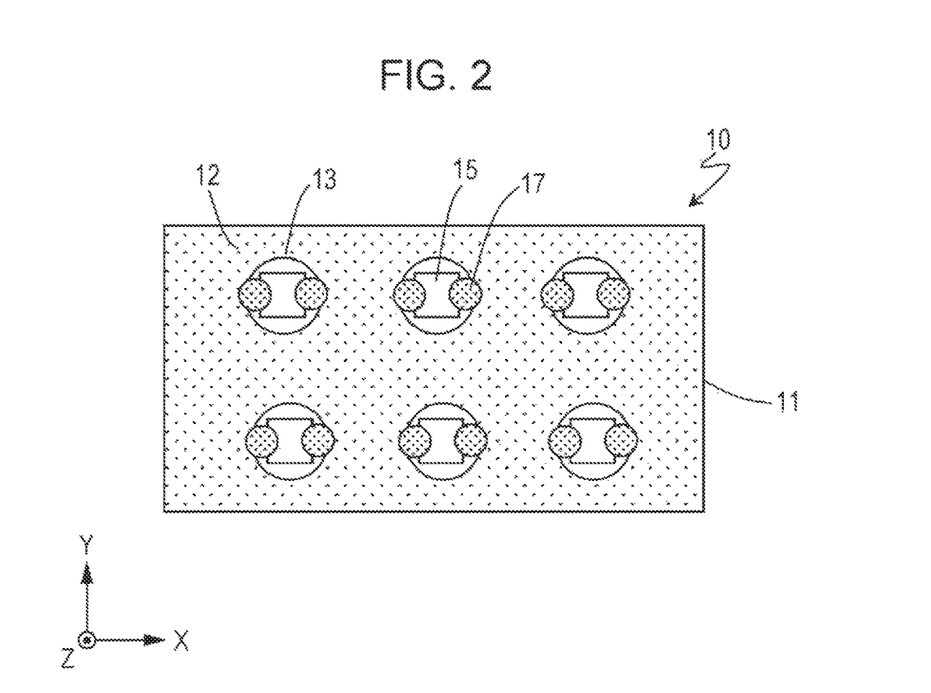
FIG. 2 is a schematic plan view illustrating a configuration of an illumination-device main part in the illumination device.

FIG. 2 is a schematic plan view illustrating a configuration of a main part of the backlight device 10 according to the first embodiment illustrated in FIG. 1 and illustrating a configuration from which the optical member 24 is removed. The backlight device 10 includes an LED substrate 11 (substrate) on which a plurality of the LEDs 15 (light source elements) are disposed adjacent to each other, and a reflection sheet 12 (reflection member) disposed on the LED substrate 11.

The LED substrate 11 is connected to a power source substrate, a control substrate, or the like, which is not illustrated. A voltage is applied through the LED substrate 11 to the LEDs 15, and light emission of the LEDs 15 is controlled. As the LEDs 15, general surface-mount-type LEDs, such as CLCC (Ceramic Leaded Chip Carrier), PLCC (Plastic Leaded Chip Carrier), or the like, are usable. As a light source for the local dimming drive, mini LEDs suitable for achieving high brightness and high image quality are preferably used. Mini LEDs are small in size that is approximately 100 to 200 μm, and thus, providing light emission portions with phosphor is difficult. Thus, there are many mini LEDs of a type that emits light with a single color (blue or the like); however, disposing a wavelength conversion sheet directly above mini LEDs enables the mini LEDs to convert the light to white light.

The reflection sheet 12 of a silver deposition type is generally used. The thickness of the reflection sheet 12 is approximately 60 to 80 μm. The reflection sheet 12 has a plurality of openings 13, and the openings 13 are each disposed in correspondence to the plurality of LEDs 15 on the LED substrate 11. The reflection sheet 12 and the LED substrate 11 are positioned such that the LEDs 15 are each disposed within a center portion of respective openings 13.

The shape and the size of the openings 13 are changed to adapt to the shape and the size of the LEDs 15. The openings 13 are formed to be slightly larger than the LEDs 15, thereby providing gaps between the reflection sheet 12 and the LEDs 15. For example, when the LEDs 15 are mini LEDs, the mini LEDs are rectangular in plan view and approximately 0.2 mm on a side. In contrast, the openings 13 of the reflection sheet 12 are circular in plan view and has a diameter of 0.8 to 1.0 mm. Therefore, the gaps generated between the reflection sheet 12 and the LEDs 15 are 0.3 to 0.4 mm at maximum on one side of the LEDs 15.

In the backlight device 10 according to the first embodiment, as illustrated in FIG. 2, at least one of the plurality of openings 13 is provided with support bodies 17 at a portion of the gap.

Figure 3:
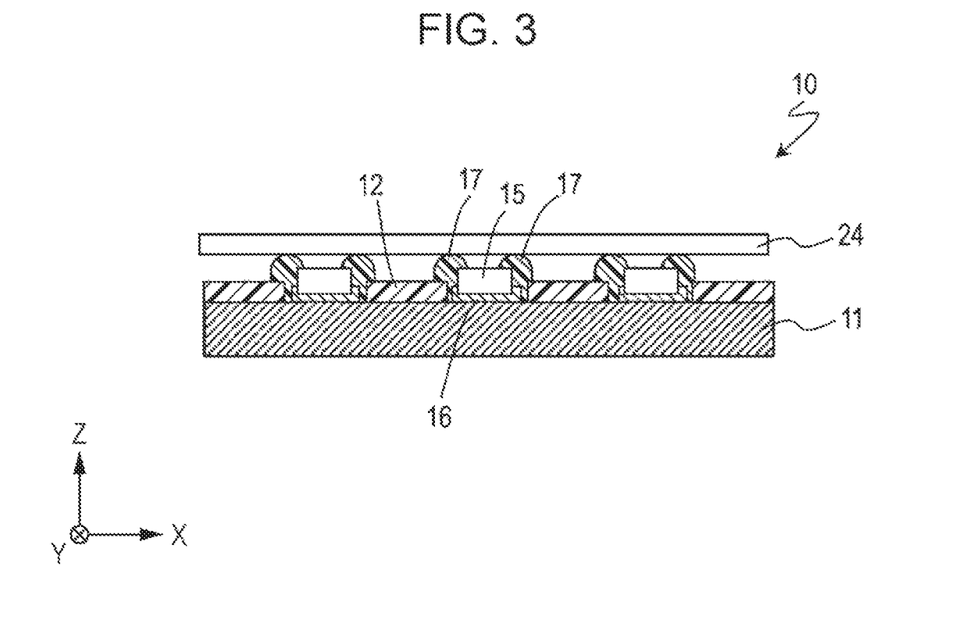
FIG. 3 is a schematic sectional view illustrating a configuration of a main part of the illumination device.

FIG. 3 is a schematic sectional view of the backlight device 10, illustrating a structure of the support bodies 17.

The support bodies 17 are formed of a resin material, such as polycarbonate, acryl, epoxy, or the like. The support bodies 17 are formed by being applied using an inkjet method, a screen printing method, or the like and being cured with UV.

The support bodies 17 each have an R-shaped top portion so as not to damage the optical member 24 when coming into contact therewith. Such an R shape can be formed by repeating application and curing of the resin in several times.

The support bodies 17 are disposed in gaps between the reflection sheet 12 and the LEDs 15 at the openings 13 and thus do not generally hinder travelling of light emitted from the LEDs 15 and light reflected from the reflection sheet 12; therefore, the resin material is not limited to the materials mentioned above. There is, however, a case in which the support bodies 17 have to be formed in small gaps and to be placed on the reflection sheet 12 and the LEDs 15, and it is thus preferable that a transparent resin having high transparency be used for the support bodies 17.

As illustrated in FIG. 3, the support bodies 17 are formed to be higher than the height of the LEDs 15. For example, the height of the LEDs 15 is 100 μm, and the height of the support bodies 17 is 250 μm. The height of the support bodies 17 is adjusted in accordance with gaps required between the LEDs 15 and the optical sheet 21.

The support bodies 17 fill the gaps between the reflection sheet 12 and the LEDs 15 at the openings 13 and fixes the reflection sheet 12 to the LED substrate 11 while also fixing a relative position of the reflection sheet 12 and the LEDs 15. Consequently, the reflection sheet 12 is prevented from coming into contact with and damaging the LEDs 15 as a result of being displaced and from coming into contact with terminal portions 16 of the LEDs 15 and causing short circuit.

In addition, the support bodies 17 project upward more than the LEDs 15 and support the optical sheet 21 disposed directly above the LEDs 15. Consequently, the gaps between the LED 15 and the optical member 24 are maintained constant by the support bodies 17, and the LEDs 15 and the optical member 24 thus do not come into contact with each other. Consequently, both are prevented from being damaged.

In addition, in positioning of the reflection sheet 12, the reflection sheet 12 and the LED substrate 11 may be stuck together with an adhesive material while being pressed by a roller. In this case, the roller passes on the LEDs 15, and, due to the support bodies 17 projecting at side portions of the LEDs 15, the roller is prevented from coming into contact with and damaging the LEDs 15.

As a result of the aforementioned configuration, in the liquid crystal display 100 including the backlight device 10 according to the first embodiment, degradation of display quality can be prevented.

As mentioned above, the backlight device 10, as an illumination device, according to the present embodiment, includes: the LED substrate 11, as a substrate; the LEDs 15, as a plurality of light source elements, disposed adjacent to each other on the LED substrate 11; the reflection sheet 12, as a reflection member, disposed on the LED substrate 11 and having the plurality of openings 13 at which the LEDs 15 are disposed; and the support bodies 17 that are formed at least in the gap between the reflection sheet 12 and the LEDs 15, at least one of the plurality of openings 13 and that project further than the LEDs 15 on a side opposite to the LED substrate 11, that is, the front side and support the optical member 24.

According to this configuration, at the openings 13 of the reflection sheet 12 on which the LEDs 15 are disposed, the support bodies 17 protruding further than the LEDs 15 are formed in the gaps between the LEDs 15 and the reflection sheet 12. Thus, the support bodies 17 maintain the gaps between the LEDs 15 and the reflection sheet 12 to be constant. In addition, the support bodies 17 maintain gaps between the LEDs 15 and the optical member 24 disposed directly above the LEDs 15 to be constant. Consequently, damage of the LEDs 15, the reflection sheet 12, and the optical member 24 is prevented, and the display quality of the liquid crystal display 100, as a display, can be suppressed from being degraded.

First Modification of First Embodiment

Figure 4:
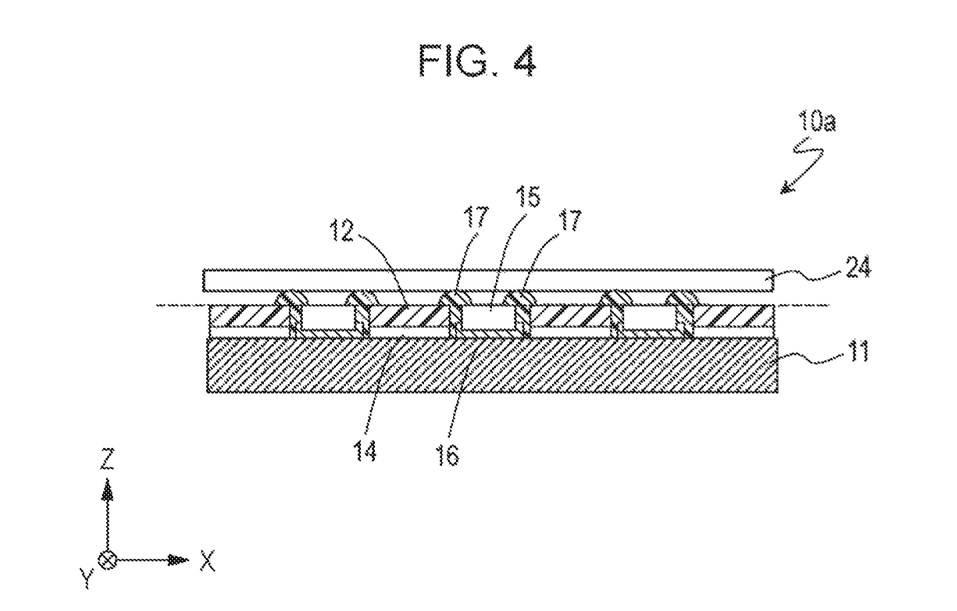
FIG. 4 is a schematic sectional view illustrating a configuration of a main part of a first modification of the illumination device.

FIG. 4 is a schematic sectional view illustrating a configuration of a main part of a backlight device 10a, which is a first modification of the first embodiment. In the backlight device 10a of the first modification, a laminate sheet 14 (PET) whose thickness is adjusted is bonded onto the rear surface of the reflection sheet 12 so that the height of the reflection sheet 12 and the height of the LEDs 15 are equal or substantially equal to each other.

For example, when the LEDs 15 are mini LEDs, the height (thickness) of the LEDs 15 is 100 μm, and the height of the reflection sheet 12 is 60 μm. Therefore, when a resin material that becomes the support bodies 17 is applied in an inkjet method or a screen printing method, the support bodies 17 may be displaced toward the reflection sheet 12.

The backlight device 10a of the first modification enables, due to the height of the reflection sheet 12 and the height of the LED 15 coinciding with each other, the support bodies 17 to be formed at a prescribed location with precision even in the inkjet method or the screen printing method.

Second Modification of First Embodiment

Figure 5:
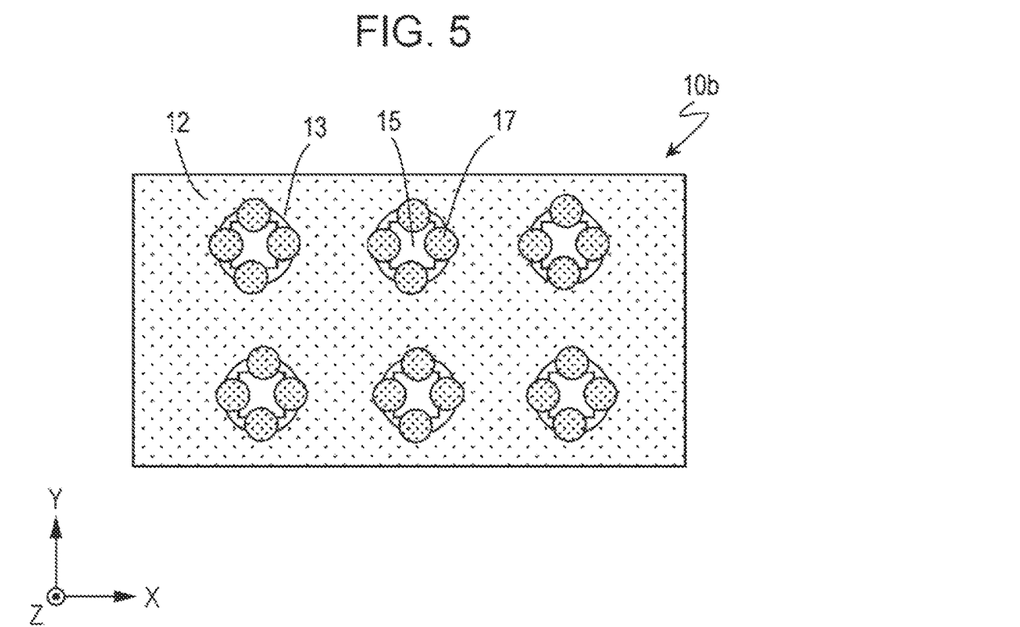
FIG. 5 is a schematic plan view illustrating a configuration of a main part of a second modification of the illumination device.

FIG. 5 is a schematic plan view illustrating a configuration of a main part of a backlight device 10b, which is a second modification of the first embodiment. In the backlight device 10b of the second modification, four support bodies 17 are disposed with respect to each one of the openings 13. The support bodies 17 are disposed, for example, in correspondence to the four sides of the LEDs 15.

As mentioned above, in the backlight device 10b illustrated in the second modification, the number of the support bodies 17 is increased, thereby suppressing displacement of the reflection sheet 12 in a whole plane (XY direction). As a result, contact between the reflection sheet 12 and the LEDs 15 is further prevented. In addition, the area of the optical member 24 supported by the support bodies 17 is increased, and thus, contact between the LEDs 15 and the optical member 24 is also further prevented.

Note that the number of the support bodies 17 is not limited to two or four with respect to each one of the openings 13, as in the backlight device 10 of the first embodiment and the backlight device 10b of the second modification, and can be increased and decreased in accordance with a circumstance.

Third Modification of First Embodiment

Figure 6:
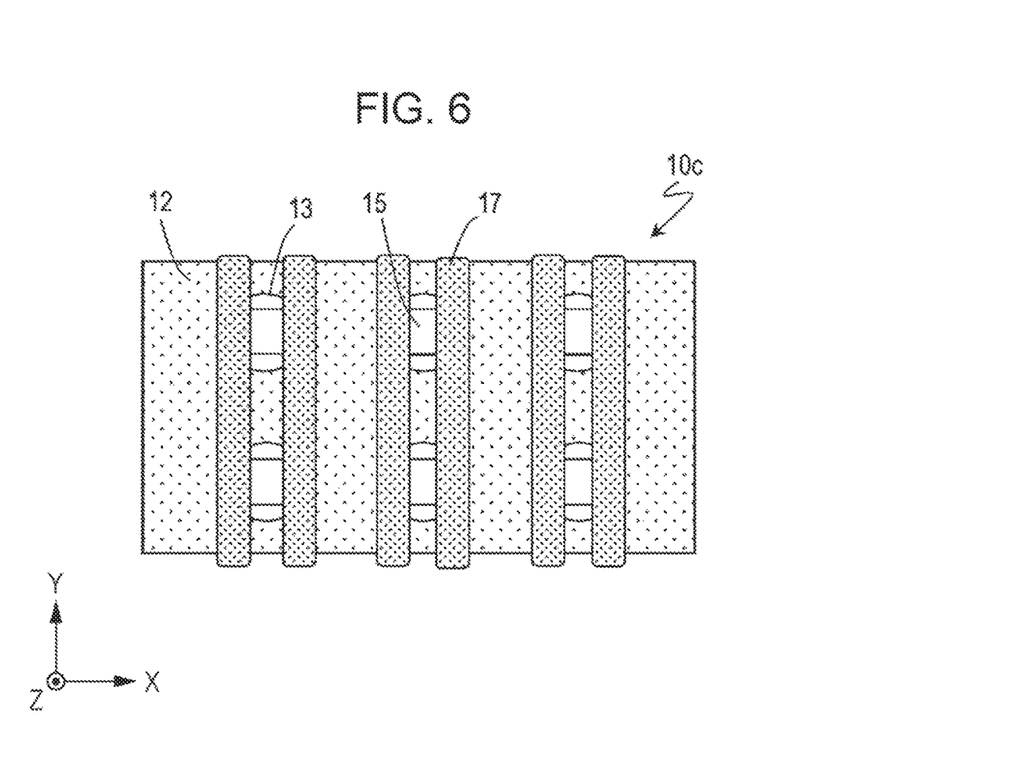
FIG. 6 is a schematic plan view illustrating a configuration of a main part of a third modification of the illumination device.

FIG. 6 is a schematic plan view illustrating a configuration of a main part of a backlight device 10c, which is a third modification of the first embodiment. In the backlight device 10c of the third modification, the support bodies 17 are formed in a linear shape so as to be continuously disposed at two or more of the plurality of openings 13 in plan view.

In the backlight device 10c illustrated in the third modification, due to the support bodies 17 being thus formed in a linear shape so as to be continuously disposed at two or more of the plurality of openings 13 in plan view, contact between the reflection sheet 12 and the LEDs 15 is further prevented. In addition, the area of the optical member 24 supported by the support bodies 17 is increased, and thus, contact between the LEDs 15 and the optical member 24 is also further prevented.

In addition, in the backlight device 10c, due to the support bodies 17 being continuously formed in a linear shape, rigidity of the reflection sheet 12 can be increased in an extending direction of the support bodies 17. As a result, sagging of the optical member 24 can be also suppressed in the extending direction of the support bodies 17.

Note that, in the backlight device 10c of the third modification, the linear support bodies 17 are formed so as to extend in the Y direction, as illustrated in FIG. 6, but may be formed in the X direction or formed so as to cross in the XY direction. Consequently, it is possible to further increase rigidity of the reflection sheet 12 in each in-plane direction and suppression of sagging of the optical member 24.

Fourth Modification of First Embodiment

Figure 7:
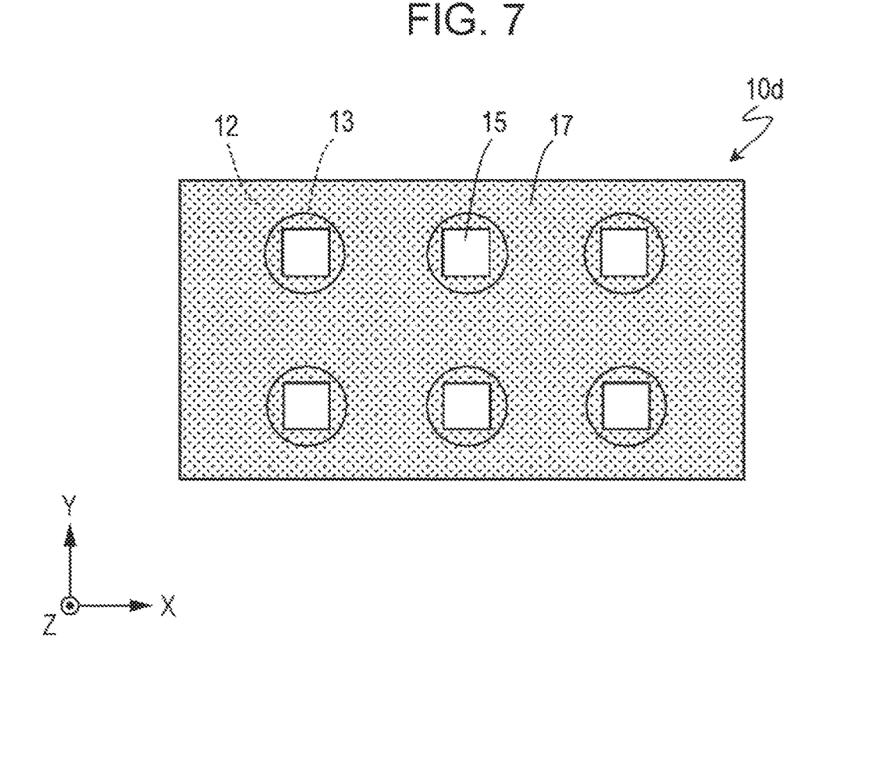
FIG. 7 is a schematic plan view illustrating a configuration of a main part of a fourth modification of the illumination device.

FIG. 7 is a schematic plan view illustrating a configuration of a main part of a backlight device 10d, which is a fourth modification of the first embodiment. In the backlight device 10d of the fourth modification, the support bodies 17 are formed at, excluding light emission surfaces (top view) of the LEDs 15, the reflection sheet 12 and an entirety of the openings 13. In the backlight device 10d of the fourth modification, the support bodies 17 are formed also on the upper surface of the reflection sheet 12, and thus, to suppress light reflected from the reflection sheet 12 from attenuating, a transparent resin having high transparency is used for the support bodies 17.

Figure 8:
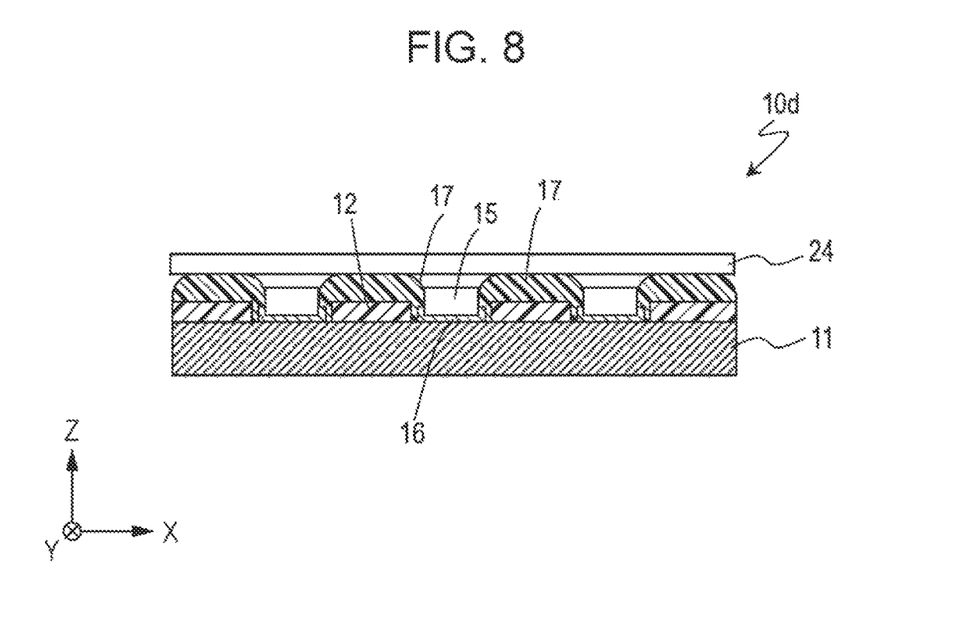
FIG. 8 is a schematic sectional view illustrating a configuration of a main part of the illumination device of the fourth modification.

FIG. 8 is a schematic sectional view illustrating a configuration of a main part of the backlight device 10d of the fourth modification. As illustrated in FIG. 8, the optical member 24 is supported by, excluding the light emission surfaces of the LEDs 15, the entire surfaces of the support bodies 17. Consequently, even when the optical member 24 is thin and easily sags, contact with the LEDs 15 can be reliably prevented.

In addition, the LEDs 15 are covered by the support bodies 17 such that the terminal portions 16 are surrounded, and thus, leakage due to contact with the reflection sheet 12 is prevented, and the terminal portions 16 are protected from circumambient moisture, which improves reliability.

Second Embodiment

Figure 9:
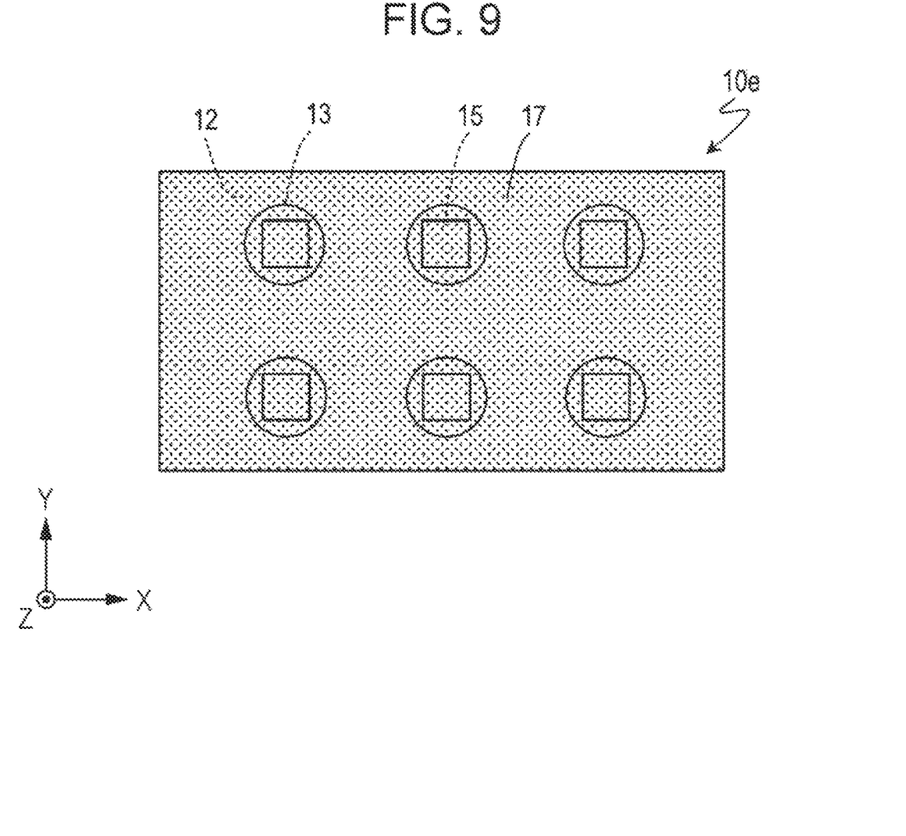
FIG. 9 is a schematic plan view illustrating a configuration of a main part of an illumination device according to a second embodiment of the present invention.

FIG. 9 is a schematic plan view illustrating a portion of a backlight device 10e according to a second embodiment. In the backlight device 10e according to the second embodiment, the support bodies 17 are formed at, including the light emission surfaces of the LEDs 15, the reflection sheet 12 and the entirety of the openings 13.

In the backlight device 10e according to the second embodiment, the support bodies 17 are formed also on a reflection surface of the reflection sheet 12 and on the light emission surfaces of the LEDs 15, and thus, a transparent resin having high transparency is used for the support bodies 17 so that light emitted from the backlight device 10e does not attenuate.

Figure 10:
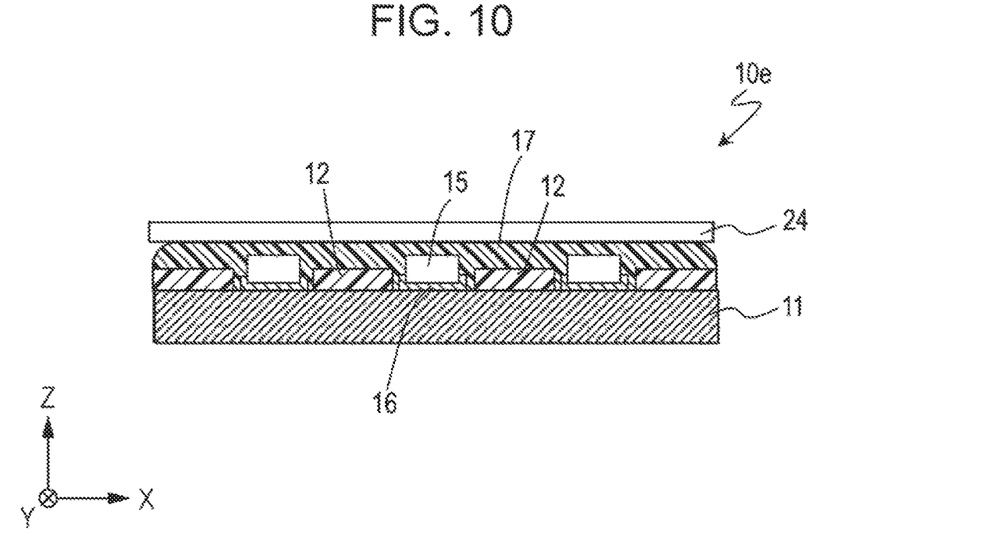
FIG. 10 is a schematic sectional view illustrating a configuration of a main part of the illumination device.

FIG. 10 is a schematic sectional view illustrating a configuration of a main part of the backlight device 10e according to the second embodiment. As illustrated in FIG. 10, the optical member 24 is supported by the entire surfaces of the support bodies 17 of the LEDs 15. Consequently, even when the optical member 24 is thin and easily sags, contact with the LEDs 15 is completely prevented.

In addition, the LEDs 15 are covered at the entirety thereof including the terminal portions 16 by the support bodies 17 and thus prevent leakage due to contact between the terminal portions 16 and the reflection sheet 12, and are protected from circumambient moisture and thus further improves reliability.

The present invention is not limited to the embodiments described above and can be variously changed within the scope indicated in the claims, and embodiments obtained by combining, as appropriate, the technical means disclosed in different embodiments are also included in the technical scope of the present invention. Moreover, new technical features can be formed by combining the technical means disclosed in respective embodiments.

REFERENCE SIGNS LIST 10, 10a to 10e backlight device (illumination device)
11 LED substrate (substrate)
12 reflection sheet
13 opening
14 laminate sheet
15 LED (light source element)
16 terminal portion
17 support body
18 frame
20 liquid crystal panel
21, 22 optical sheet
23 diffusion sheet
24 optical member
25 transparent protection member
100 liquid crystal display

The invention claimed is:

1. An illumination device comprising:
   a substrate;
   a plurality of light source elements disposed adjacent to each other on the substrate;
   an optical member disposed to face the light source elements;
   a reflection member disposed on the substrate and having a plurality of openings at which the light source elements are disposed; and
   a support body within at least one of the plurality of openings and formed at in a gap between the reflection member and the light source elements; the support body projecting further than the light source elements on a side opposite to the substrate and supporting the optical member.

2. The illumination device according to claim 1, wherein a height of the reflection member and a height of the light source elements are equal or substantially equal to each other.

3. The illumination device according to claim 1, wherein the support body is formed in a linear shape so as to be continuously disposed at two or more of the openings in plan view.

4. The illumination device according to claim 1, wherein the support body is formed at an entirety of the reflection member and an entirety of gaps of the plurality of openings.

5. The illumination device according to claim 4, wherein the support body is formed at an entirety of the plurality of light source elements.

6. A display comprising the illumination device according to claim 1.

7. The illumination device according to claim 1, wherein a height of the reflection member and a height of the light source elements are equal or substantially equal to each other.

8. The illumination device according to claim 1, wherein the support body is formed in a linear shape so as to be continuously disposed at two or more of the openings in plan view.

9. A display comprising the illumination device according to claim 1.

10. An illumination device comprising:
    a substrate;

a plurality of light source elements disposed adjacent to each other on the substrate;

an optical member disposed to face the light source elements;

a reflection member disposed on the substrate and having a plurality of openings at which the light source elements are disposed; and a support body formed within each of the plurality of openings and in a gap between the reflection member and the light source elements, the support body projecting further than the light source elements on a side opposite to the substrate and supporting the optical member.

11. An illumination device comprising:

a substrate;

a plurality of light source elements disposed adjacent to each other on the substrate;

an optical member disposed to face the light source elements;

a reflection member disposed on the substrate and having a plurality of openings at which the light source elements are disposed; and a support body made of transparent resin; the support body formed within the plurality of openings in a gap between the reflection member and the light source elements resulting in a plurality of support bodies within the plurality of openings in the reflection member.

* * * * *